(12) United States Patent
Matthews et al.

(10) Patent No.: US 6,254,803 B1
(45) Date of Patent: Jul. 3, 2001

(54) OXYGEN SCAVENGERS WITH REDUCED OXIDATION PRODUCTS FOR USE IN PLASTIC FILMS

(75) Inventors: Andrew E. Matthews, Greer, SC (US); Craig Depree, Palmerston North (NZ)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/275,329

(22) Filed: Mar. 24, 1999

(30) Foreign Application Priority Data

Mar. 25, 1998 (NZ) ....................................... 330077

(51) Int. Cl.⁷ .............................. B01J 20/26; B01J 23/00; C09K 15/00
(52) U.S. Cl. .................................... 252/188.28; 252/188.1
(58) Field of Search ....................... 252/188.28; 522/39, 522/46, 81, 101, 104, 71; 524/4, 5, 900, 601

(56) References Cited

U.S. PATENT DOCUMENTS

| | | | |
|---|---|---|---|
| 4,908,151 | * | 3/1990 | Inoue .............................. 252/188.28 |
| 4,983,651 | * | 1/1991 | Griffin ..................................... 524/47 |
| 5,049,624 | * | 9/1991 | Adams et al. . |
| 5,211,875 | * | 5/1993 | Speer et al. ...................... 252/188.28 |
| 5,286,407 | * | 2/1994 | Inoue et al. ...................... 252/188.28 |
| 5,399,289 | * | 3/1995 | Speer et al. ...................... 252/188.28 |
| 5,981,676 | * | 11/1999 | Gauthier ............................... 526/308 |

* cited by examiner

Primary Examiner—James J. Seidleck
Assistant Examiner—Sanza McClendon
(74) Attorney, Agent, or Firm—Mark B. Quatt

(57) ABSTRACT

An oxygen scavenger composition, for use in or with plastics materials, includes a polymer or oligomer having at least one cyclohexene group or functionality. The composition produces only low levels of volatile or extractable (from a plastics material in which it is incorporated) products as a consequence of oxygen scavenging.

17 Claims, No Drawings

OXYGEN SCAVENGERS WITH REDUCED OXIDATION PRODUCTS FOR USE IN PLASTIC FILMS

FIELD OF THE INVENTION

The present invention is directed to oxygen scavengers for use in plastics materials, and in particular plastics films. Emphasis is given to scavengers which produce low or negligible levels of oxidation by-products which may contaminate the head space in a package.

BACKGROUND OF THE INVENTION

The majority of plastic films produced are employed in some form of packaging. The present invention is primarily concerned with those films used for applications requiring a low level of oxygen in a package, though may also find other uses. Primarily this type of packaging includes comestibles such as meat, which are often packaged to have a low oxygen environment.

Limiting the exposure of oxygen-sensitive products to oxygen maintains and enhances the quality and shelf life of many products. For instance, by limiting the oxygen exposure of oxygen-sensitive food products in a packaging system, the quality of the food product can be maintained and spoilage retarded. In addition, such packaging also keeps the product in inventory longer, thereby reducing costs incurred from waste and having to restock.

In the food packaging industry, several techniques for limiting oxygen exposure have been developed. Common techniques include those where oxygen is consumed within the packaging environment by some means other than the packaged article or the packaging material (e.g., through the use of oxygen scavenging sachets), those where reduced oxygen environments are created in the package (e.g., modified atmosphere packaging (MAP) and vacuum packaging), and those where oxygen is prevented from entering the packaging environment (e.g., barrier films).

The art dealing with barrier packaging, and the low oxygen or modified packaging of products is relatively well developed. This includes the use of films and inserts containing oxygen scavenging compounds able to extract a majority of any residual oxygen after packaging occurs.

Oxygen scavenging compounds for use in plastic films are relatively well known.
For instance:

Michael Rooney, "Oxygen scavenging: a novel use of rubber photo-oxidation", Chemistry and Industry, Mar. 20, 1982, pp 197–198 describes the use of ethylenically unsaturated compounds as oxygen scavengers on exposure to light. However systems describing the use of transition metal catalysts are not described.

U.S. Pat. No. 4,908,151 to Mitsubishi, describes sachets containing unsaturated fatty acid (i.e. an ethylenically unsaturated hydrocarbon) in combination with a transition metal compound in a basic substance. However there is no description of these materials in the form of a film nor the use of photo-exposure as an initiating mechanism. The disadvantages of sachets include the need for additional packaging steps (to add the sachet to the package), the potential for contamination of the packaged article should the sachet break, and the potential of ingestion by a consumer.

Japanese patent JP5032277 to Kuwa describes the use of radical containing resin layers in packages. The invention comprises an oxidizable polymer whose oxygen scavenging abilities is photoinitiated.

New Zealand patent application NZ241802 to W. R. Grace and also NZ243077 also to W. R. Grace, claim oxygen scavenging compositions comprising ethylenically unsaturated hydrocarbons with transition metal catalysts. A wide range of ethylenically unsaturated compounds are discussed in the texts of these specifications though there is no mention of the problem to which the present invention is directed, nor the compounds and products encompassed by the present invention.

Oxygen scavenging materials also have been incorporated directly into the packaging structure. This technique (hereinafter referred to as "active oxygen barrier") can provide a uniform scavenging effect throughout the package and can provide a means of intercepting and scavenging oxygen as it passes through the walls of a package, thereby maintaining the lowest possible oxygen level throughout the package. Active oxygen barriers have been formed by incorporating inorganic powders and/or salts as part of the package. See, e.g., U.S. Pat. Nos. 5,153,038, 5,116,660, 5,143,769, and 5,089,323. However, incorporation of such powders and/or salts can degrade the transparency and mechanical properties (e.g., tear strength) of the packaging material and can complicate processing, especially where thin films are desired. Also, these compounds as well as their oxidation products can be absorbed by food in the container, which can result in the food product failing to meet governmental standards for human consumption.

EP 0 519 616 discloses an oxygen scavenging composition that includes a blend of an epoxide, a first polymeric component grafted with an unsaturated carboxylic anhydride and/or acid, a second polymeric component including OH, SH, or NHR2 groups where $R^2$ is H, $C_1$–$C_3$ alkyl, or substituted $C_1$–$C_3$ alkyl moiety, and a metal salt capable of catalyzing the reaction between oxygen and the second polymeric component. The first polymeric component is present in an amount sufficient to ensure that the blend is non-phase separated. A blend of polymers is utilized to obtain oxygen scavenging, and the second polymeric component is preferably a (co)polyamide such as MXD6.

Another type of active oxygen barrier is illustrated in EP-A-0 301 719, EP-A-0 380 319, PCT publication no. WO 90/00578, and PCT publication no. WO 90/00504. See also U.S. Pat. Nos. 5,021,515, 5,194,478, and 5,159,005. The disclosed oxygen scavenger includes polyamide-transition metal catalyst compositions. Through catalyzed scavenging by the polyamide, the package wall regulates the amount of oxygen reaching the interior of the package. However, the onset of useful oxygen scavenging (i.e., up to about 5.8× $10^{-5}$ $cm^3/m^2 \cdot s$ or 5 $cm^3/m^2 \cdot 24$ hours at ambient conditions) can take as long as 30 days to occur. Therefore, this technique is not acceptable for many applications. Further, polyamides typically are incompatible with many thermoplastic polymers commonly used to make flexible packaging materials (e.g., ethylene/vinyl acetate copolymers, low density polyethylene, etc.) or, when used by themselves, are difficult to process and result in inappropriately stiff structures.

Oxygen scavenging compositions that include transition metal catalysts and ethylenically unsaturated hydrocarbon polymers which have an ethylenic double bond content of from 0.01 to 10 equivalents per 100 grams of polymer are disclosed in U.S. Pat. No. 5,399,289. Various conventional homopolymers, copolymers, and polymer blends are disclosed. Because these polymers are amorphous, they can be difficult to blend and process with film-forming semicrystalline polymers conventionally used to make flexible packaging materials.

The use of a transition metal and a photoinitiator to facilitate initiation of effective scavenging activity of ethylenically unsaturated compounds is taught in U.S. Pat. No. 5,211,875, which is incorporated herein by reference as if set forth in full.

PCT publication nos. WO 95/02616 and WO 96/40799 disclose a scavenger composition that includes a transition metal salt and a copolymer (of ethylene and a vinyl monomer) having ether, amino, carboxylic acid, ester, or amide functionalities pendent therefrom. Although these compositions can provide oxygen scavenging activity, the particular advantages of having ethylenic unsaturation contained within a cyclic moiety are not disclosed. Because the compositions of this invention are significantly cleaner than those described in the prior art, they do not require the use of high levels of adjuncts to absorb the undesirable byproducts. Such absorbent additives are known in the art, for example see U.S. Pat. No. 5,834,079 and U.S. Pat. No. 08/857,276. It is also well know in the art that such additives (zeolites and silicas) adversely effect the haze and clarity of packaging structures.

PCT Application WO 96/40799 describes the use of a variety of ethylenic materials with benzylic, allylic or ether containing side chains. Some of these materials may be prepared by esterification or transesterification of a polymer melt. The use of pendent cyclic groups containing allylic unsaturation is generally referred to, but there is only one such example, wherein Nopol, a bicyclic alcohol, is used in a transesterification reaction and oxygen absorbing films are formulated from the product. There is no reference to the benefits of cyclic allylic compounds as described in this invention i.e., on oxidation they produce very low levels of oxidation byproducts when compared to comparable linear allylic systems. Because of its bicyclic nature, Nopol is not expected to produce these benefits.

While the prior art compounds may effectively scavenge oxygen they introduce other problems into packaging. For instance, in summary the prior art incorporates into film structures compounds which are ethylenically unsaturated but which often cleave as a consequence of the reactions of the oxygen scavenging process. For example, films containing unsaturated compounds such as squalene or vegetable oils produce large amounts of volatile aldehydes and ketones upon oxidation. Unfortunately many of these volatile compounds are not contained within the film structure and find their way into the head space of the package. Here they can represent more of a problem than the oxygen which they have replaced and have the potential to contaminate comestible products.

This problem represents a significant problem yet has been downplayed or overlooked by the published prior art. As a consequence, those searching the prior art for a solution to this problem find no answer—the art appears to be directed primarily along a narrow track of improving on scavenging efficiencies, or physical properties of scavenging films, rather than recognizing or addressing other associated problems.

Accordingly the present invention seeks to address the problems associated with scission products of oxygen scavengers, and seeks also to provide a group of compounds and substances (as well as films and plastic materials including same) which have an advantage over the prior art in terms of reduced quantities of scission products.

Ideally, a polymeric material for use in an oxygen scavenging composition should exhibit good processing characteristics, be able to be formed into useful packaging materials or have high compatibility with those polymers commonly used to make packaging materials, and not produce byproducts which detract from the color, taste, or odor of the packaged product. It has been found that when the ethylenic unsaturation is contained within a cyclic group, substantially fewer and less byproducts are produced upon oxidation as compared to analogous non-cyclic materials. Optimally, a packaging material formed from such a composition can retain its physical properties after significant oxygen scavenging.

Further aspects and advantages of the present invention will become apparent from the ensuing description which is given by way of example only.

SUMMARY OF THE INVENTION

According to one aspect of the present invention there is provided an oxygen scavenger for use in or with plastics materials, said scavenger comprising or including a polymer or oligomer having at least one cyclohexene group or functionality.

According to another aspect of the present invention there is provided an oxygen scavenger, substantially as described above, which produces only low levels of volatile or extractable (from a plastics material in which it is incorporated) products as a consequence of oxygen scavenging.

According to another aspect of the present invention there is provided an oxygen scavenger, substantially as described above, which is substantially stable with respect to reaction with oxygen until triggered by an external event.

According to another aspect of the present invention there is provided an oxygen scavenger, substantially as described above, wherein the external event is irradiation by actinic or electromagnetic radiation.

According to a further aspect of the present invention there is provided an oxygen scavenging composition including an oxygen scavenger, substantially as described above, which includes one or more trigger enhancing components making the scavenger susceptible to triggering from an external event.

According to another aspect of the present invention there is provided an oxygen scavenging composition, substantially as described above, wherein a trigger enhancing component may be benzophenone or substituted derivatives thereof.

According to another aspect of the present invention there is provided an oxygen scavenging composition, substantially as described above, which includes the presence of one or more catalysts for the scavenging process.

According to another aspect of the present invention there is provided an oxygen scavenging composition, substantially as described above, in which a catalyst may be a transition metal salt, compound or complex.

According to another aspect of the present invention there is provided an oxygen scavenger or oxygen scavenging composition, substantially as described above, which is in the form of a plastics resin.

According to another aspect of the present invention there is provided an oxygen scavenger or oxygen scavenging composition, substantially as described above, in which the plastics resin is a resin suitable for use in the manufacture of plastic films.

According to another aspect of the present invention there is provided an oxygen scavenger or oxygen scavenging composition, substantially as described above, in which the plastic resin is a polyester resin.

According to another aspect of the present invention there is provided an oxygen scavenger or oxygen scavenging composition, substantially as described above, when present in a plastics film or layer thereof.

According to another aspect of the present invention there is provided an oxygen scavenger or oxygen scavenging composition, substantially as described above, when used as a polymeric material of a plastics film, a layer thereof, and/or a coating thereof, or in a plastic material.

According to another aspect of the present invention there is provided an oxygen scavenger or oxygen scavenging composition, substantially as described above, when dispersed throughout a plastics film, a layer thereof, and/or a coating thereon, or in a plastics material.

According to a further aspect of the present invention there is provided an oxygen scavenger or oxygen scavenging composition prepared from the reaction of a tetrahydrophthalic anhydride with at least one of a diol, a hydroxy compound, or polyhydroxy compound.

According to a further aspect of the present invention there is provided an oxygen scavenger or oxygen scavenging composition prepared from the reaction of a tetrahydrophthalic anhydride or tetrahydrophthallic acid with at least one of a diol, a hydroxy compound or polyhydroxy compound, in the presence of or absence of an esterification catalyst.

According to a further aspect of the present invention there is provided an oxygen scavenger or oxygen scavenging composition prepared from an ester or diester of a tetrahydrophthalic anhydride, in the presence of or absence of a transesterification or esterification catalyst.

According to another aspect of the present invention there is provided an oxygen scavenger or oxygen scavenging composition, substantially as described above, in which the anhydride comprises 1,2,3,6-tetrahydrophthalic anhydride or tetrahydrophthalic anhydride monomer derivable from butadiene, 2,3-dimethyl-1,3-butadiene or isoprene.

According to a further aspect of the present invention there is provided an oxygen scavenger or oxygen scavenging composition prepared from the reaction of a tetrahydrobenzyl alcohol, tetrahydrobenzyl amine, or other cyclohexenyl amine with one or more compounds having one or more of the following functionalities: carboxylic acid, acid halide, ester, anhydride, and isocyanate.

According to another aspect of the present invention there is provided an oxygen scavenger or oxygen scavenging composition, substantially as described above, in which the alcohol comprises tetrahydrobenzyl alcohol.

According to another aspect of the present invention there is provided an oxygen scavenger or oxygen scavenging composition, substantially as described above, in the compounds with which the alcohol or amine is reacted may include a styrene maleic anhydride copolymer, or other olefin maleic anhydride copolymer, and/or a polyfunctional isocyanate.

According to another aspect of the present invention there is provided an oxygen scavenger or oxygen scavenging composition, prepared from a cyclohexene dimethanol compound.

According to another aspect of the present invention there is provided an oxygen scavenging polymer including at least one pendant cyclohexene group prepared by a reactive extrusion process.

According to a further aspect of the present invention there is provided an oxygen scavenger or oxygen scavenging polymer, substantially as described above, in which the reactive extrusion process comprises an esterification or transesterification step. Suitable catalyst include acids, bases and organometallic compounds such as the titanium alkoxides.

According to another aspect of the present invention there is provided an oxygen scavenger or oxygen scavenging polymer prepared by a route including a cyclohexene anhydride.

According to a further aspect of the present invention there is provided an oxygen scavenger including a pendant cyclic alkene group prepared via a method including a Diels Alder addition reaction.

According to another aspect of the present invention there is provided an oxygen scavenger, substantially as described above, in which the preferred dienes for use in the Diels Alder reaction is substituted and/or unsubstituted 1,3 butadiene.

According to another aspect of the present invention there is provided an oxygen scavenger, substantially as described above, in which the preferred dienophile for use in the Diels Alder reaction include unsaturated acids, anhydrides, and esters.

According to another aspect of the present invention there is provided an oxygen scavenger, substantially as described above, in which the cyclic alkene is cyclohexene.

In other aspects, the present invention provides an article which include at least one layer formed from a blend that includes the foregoing composition as well as a method of scavenging oxygen in which a packaging article, at least one layer of which is formed from a blend that includes the foregoing composition, is exposed to actinic or e-beam radiation so as to activate the composition.

According to a further aspect of the present invention there is provided an oxygen scavenger or oxygen scavenging composition prepared from a tetrahydrophthalic anhydride and a polymer or lower molecular weight compound containing at least one amine group.

According to a further aspect of the present invention there is provided an oxygen scavenger or oxygen scavenging composition prepared from diglcidyltetrahydrophthalate.

According to a further aspect of the present invention there is provided an oxygen scavenger or oxygen scavenging composition prepared from the reaction of tetrahydrobenzyl alcohol, methyl or dimethyl substituted tetrahydrobenzyl alcohol with one or more compounds having one or more of the following functionalities: carboxylic acid, acid halide, ester, anhydride, epoxide or isocyanate.

According to a further aspect of the present invention there is provided an oxygen scavenger or oxygen scavenging composition, substantially as described above, in which a tetrahydrobenzyl alcohol or substituted tetrahydrobenzyl alcohol reacts with one or more of the following materials:

ethylene (meth)acrylic acid and other acid containing polymers and acid containing lower molecular weight materials;

styrene maleic anhydride copolymers; alpha olefin maleic anhydride copolymers such as octadecene maleic anhydride; isobutylene maleic anhydride; ethylene maleic anhydride; and alpha olefin maleic anhydride copolymers; ethylene alkyl (meth)acrylate maleic anhydride terpolymers and other like anhydride containing polymers or anhydride containing lower molecular weight materials;

polymeric or lower molecular weight materials containing acid halide functionality such as poly acryloyl chloride;

ethylene alkyl (meth)acrylate copolymers and terpolymers and alternative polymers or lower molecular weight materials containing lower alkyl ester functionality;

epoxy resins; and isocyanate functional material such as prepolymers and oligomers derived from the common diisocyanates such as MDI, TDI and the like.

According to a further aspect of the present invention there is provided an oxygen scavenger or oxygen scavenging composition prepared from a dihydroxycyclohexene compound. For example, 3-Cyclohexene-1,1-dimethanol or its substituted derivatives may be used to prepare polyurethane and polyester resins.

According to a further aspect of the present invention there is provided an oxygen scavenger or oxygen absorbing composition prepared from a cylclohexene carboxylic acid. Such materials may be prepared from acrylic acid and substituted and unsubstituted butadienes. A typical example would be tetrahydrobenzoic acid, derived from acrylic acid and butadiene. This may be reacted with the following materials:

- hydroxyl functional materials such as poly(vinyl alcohol) and polyethylene-vinyl alcohol, hydroxyl functional oligomers such as poly(ethylene glycol), the polyester polyols and other lower molecular weight hydroxyl functional materials;
- poly(ethylene vinyl acetate) and poly(vinyl acetate);
- amine functional polymers and lower molecular weight compounds; and
- polyvalent metal ions.

According to a further aspect of the present invention there is provided an oxygen scavenger prepared from a cyclohexene functional acid chloride. Example 1 utilises 3-Cyclohexene-1-carbonyl chloride.

According to a further aspect of the present invention there is provided an oxygen scavenger or oxygen scavenging composition prepared from tetrahydrobenzaldehyde and its substituted derivatives. These may be prepared from reaction of butadiene or the methyl substituted butadienes with acrolein.

The tetrahydrobenzaldehydes may be reacted with hydroxyl functional polymers such as poly(vinyl alcohol), poly(vinylacetate-vinyl alcohol) and polyethylene-vinyl alcohol to form polyvinyl acetals.

The following definitions apply herein throughout unless a contrary intention is expressly indicated:

- "polymer" means the polymerization product of one or more monomers and includes homopolymers, as well as copolymers;
- "copolymer" means the polymerization product of two or more kinds of monomers;
- "(meth)acrylate" means acrylate or methacrylate;
- "photoinitiator" means a substance which, when activated by actinic radiation, enhances and/or facilitates the initiation of one or more properties (e.g., oxygen scavenging) in another compound, thus resulting in a shorter induction period and/or an increase in the rate of oxygen uptake of the overall system;
- "induction period" means the length of time beginning with the initiation of the active components of a composition and ending with the onset of one or more useful properties (e.g., oxygen scavenging); and
- "antioxidant" means a material which can inhibit oxidative degradation and/or crosslinking of a poly polymer so as to, for example, prolong the useful lifetime of the polymer; to stabilize a polymer-containing composition during processing (e.g., extrusion, coating, lamination, etc.); and/or to prolong the shelf-life of the composition (prior to exposure thereof to actinic or e-beam radiation).

The present invention is directed to oxygen scavengers. The invention includes oxygen scavenging substances, as well as compositions containing same. The form of the oxygen scavengers may vary and may comprise small molecules through to large macromolecules as well as those sized in between. The oxygen scavengers will be characterized in that they will be able to react with oxygen in their near vicinity, enabling the removal of oxygen from a closed system.

While the actual form of the oxygen scavengers may vary, a characteristic that they each share is they include cyclic alkene groups or functionalities which are to react with oxygen to provide the desire oxygen scavenging properties. In preferred embodiments of the present invention, this will comprise a cyclohexene group i.e. a six membered ring with double bond between two adjacent carbon atoms. It is acceptable that some carbons of the cyclohexene group may also form part of other ring structures within the molecule, and/or form part of the skeleton of the molecule. It is not necessary that the entire $C_6$ ring be dangling free of the remainder of the molecule to which it is attached. A consideration however is that the group should be so positioned and incorporated into the structure that the double bond is available for reaction with oxygen.

It has been mentioned above that various scavengers of the present invention may take different forms. This will also have some bearing on how they are used, and also produced. Perhaps the simplest embodiments of the present invention are short molecules containing a reactive cyclohexene group which may be dispersed in an appropriate medium for use. This may include the use of short molecules (see also later) which can be dispersed within a plastic resin or material. The ultimate result would be a plastic film or material incorporating the oxygen scavenger. Of course consideration would need to be given to accessibility of the scavengers to the oxygen being scavenged though this may rely on the porosity of the film (or film layer/material) in which it is incorporated, or alternatively may be presented in the manner of a coating with a reactive surface.

While the use of oxygen scavengers of varying sizes, (though typically those of smaller size), dispersed through plastics materials is envisaged, oxygen scavengers according to the present invention may also be used in other ways.

For instance, they may be dispersed throughout non-plastics materials. This may include inert and inorganic materials. This may also include other liquids. It is envisaged that such embodiments of the present invention may be used in applications such as sachets inserted into closed packages. The use of oxygen scavengers in sachets and package inserts is documented in the art and the same principles may be applied here.

Another means by which the present invention may be applied is through the use of plastics resins incorporating the desired scavenging functionalities. These resins, which for instance may include polyester resins, may be used in the various manners by which resins are normally used. This may include film production, resin coatings, as well as moulding or extrusion techniques.

Another method by which the present invention may be implemented is the formation or modification of polymers to contain the desired scavenging functionalities and groups. In such cases the film or plastics material itself will possess oxygen scavenging properties. It is envisaged that such materials may exist as layers in multi-layer films. Such polymers may also be introduced as copolymers or blends in film and plastics manufacturing methods.

The above instances of how embodiments of the present invention may be used are illustrative only. It is noted that the use of oxygen scavenging materials is known in the art, and that art may be drawn upon to further expand the illustrative examples given within this specification.

Embodiments of the present invention based on cyclohexene groups appear to afford significant advantage over the prior art. This advantage is in the number and nature of the oxidation product once the scavenging is completed. In the prior art, heavily reliance is made on straight chain alkenes, such as for instance fatty acids. The problem however, is that films containing unsaturated compounds such as squalene or vegetable oils produce large amounts of volatile aldehydes and ketones upon oxidation. These tend to be released, or leach, from the plastics material over time, usually find their way into the head space of the packaged material. The presence of these foreign substances can represent a significant problem which the use of cyclohexene scavenging groups address at least partially.

In comparison there is significantly less scission products from oxidation reactions involving cyclohexene groups—the oxidation of the cyclohexene group does not normally involve ring breakage. If the remainder of the molecule to which the cyclohexene group is attached is bound or linked to the polymeric structure of the material in which it is incorporated or affixed, or otherwise bound or held in place to the material through which it is dispersed or incorporated, then there is little chance of there being any free scission products able to find their way from the film or material structure.

Other aspects of the present invention to some extent parallel the prior art. For instance, it is desirable that the oxygen scavenging materials are relatively stable (with respect to scavenging) until required. In many cases catalysis and/or triggering of any reaction is required. Photoinitiators such as benzophenone may be included. Initiating or triggering by electromagnetic irradiation (often in the visible through UV regions) is a convenient form of triggering and already used in some types of film manufacture. It is also used for triggering many prior art oxygen scavengers and thus employing these features and techniques of the prior art with the present invention is envisaged.

As for most other oxygen scavengers relying on alkenes, some form of catalyst is also required for the oxygen scavenging reactions to proceed effectively. Typically transition metal catalysts are used, including their salts, complexes, and other compounds. These are well documented in the prior art and may also be used with the present invention as appropriate.

DETAILED DESCRIPTION OF THE INVENTION

We have found that materials containing certain cyclohexenyl functionalities are excellent oxygen absorbers when compounded with a transition metal salt and optionally a photoinitiator, and that when these materials oxidize they produce very low levels of oxidation byproducts. This is in marked contrast to the known art, where excellent oxygen absorbers can be obtained from the use of linear unsaturated compounds compounded with a transition metal salt, and a photoinitiator, but where the levels of oxidation byproducts are excessively high. It is thought that this improvement is obtained because mild oxidation of cyclohexene does not break bonds on the ring structure whilst oxidation of a linear unsaturated material such as linoleic acid or vegetable oil under similar conditions produces smaller molecules by chain scission. When incorporated into polymers, the cyclohexene containing systems are found to produce considerably less volatile byproducts than the linear unsaturated materials.

The compositions of this invention are significantly cleaner than those described in the prior art, they do not require the use of high levels of adjuncts to absorb the undesirable byproducts. Such absorbent additives are known in the art, for example see U.S. Pat. No. 5,834,079 and U.S. Pat. No. 08/857,276. It is also well know in the art that such additives (zeolites and silicas) adversely effect the haze and clarity of packaging structures.

The oxygen scavenging composition of the invention comprises:
(a) a polymer or lower molecular weight material containing substituted cyclohexene functionality according to the following diagram:

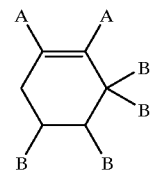

where A may be hydrogen or methyl and either one or two of the B groups is a heteroatom-containing linkage which attaches the cyclohexene ring to the said material, and wherein the remaining B groups are hydrogen or methyl;
(b) a transition metal catalyst; and optionally
(c) a photoinitiator.

The compositions may be polymeric in nature or they may be lower molecular weight materials. In either case they may be blended with further polymers or other additives. In the case of low molecular weight materials they will most likely be compounded with a carrier resin before use. The following examples represent some applications of various embodiments of the present invention currently envisaged by the patentee. These examples are not meant to be limiting nor exhaustive but merely illustrative of how the present invention may be used, or applied to address problems associated with the prior art.

The compositions of this invention can be used in a wide range of packaging materials, and are not restricted to flexible packaging films and articles such as pouches produced from such films. The compositions may also be used in the preparation of rigid and semi rigid packaging materials. Typical rigid and semi rigid articles include plastic, paper or cardboard cartons, bottles such as juice containers, thermoformed trays, or cups with wall thicknesses of about 100 to 2000 microns. The walls of such articles comprise single or multiple layers of materials The compositions can be used as the sole polymeric material from which one or more layers of a film are formed (i.e., the film can be a multilayer film having, for example, a gas barrier layer, a seal layer, etc.), it can be blended with other polymeric oxygen scavenging agents (such as polybutadiene) or it can be blended with one or more diluent polymers which are known to be useful in the formation of packaging film materials and which often can render the resultant film more flexible and/or processable. Suitable diluent polymers include, but are not limited to, polyethylenes such as, for example, low density polyethylene, very low density polyethylene, ultra-low density polyethylene, high density polyethylene, and linear low density polyethylene; polyesters such as, for example, polyethylene terephthalate (PET); polyvinyl chloride (PVC); polyvinylidene chloride (PVDC); and ethylene copolymers such as ethylene/vinyl acetate copolymer, ethylene/alkyl (meth)acrylate copolymers, ethylene/(meth)acrylic acid copolymers, and ionomers. Blends of different diluent polymers also can be used.

The compositions of this invention can also be used in non integral packaging components such as coatings, bottle cap liners, adhesive and non adhesive sheet inserts, coupons, gaskets, sealants or fibrous mat inserts Generally, the foregoing diluent polymers are semi-crystalline materials. Advantageously, the polymeric component of the composition of the present invention can be crystalline or semi-crystalline at ambient conditions and, accordingly, can be especially compatible with such diluent polymers. Selection of a particular diluent polymer(s) depends largely on the article to be manufactured and the end use thereof. For instance, certain polymers are known by the ordinarily skilled artisan to provide clarity, cleanliness, barrier properties, mechanical properties, and/or texture to the resultant article.

In combination with the polymeric component, the oxygen scavenging composition of the present invention includes a transition metal compound as an oxygen scavenger catalyst. The transition metal catalyst can be a salt which includes a metal selected from the first, second, or third transition series of the Periodic Table. The metal preferably is Rh, Ru, or one of the elements in the series of Sc to Zn (i.e., Sc, Ti, V, Cr, Mn, Fe, Co, Ni, Cu, and Zn), more preferably at least one of Mn, Fe, Co, Ni, and Cu, and most preferably Co. Suitable anions for such salts include, but are not limited to, chloride, acetate, oleate, stearate, palmitate, 2-ethylhexanoate, neodecanoate, and naphthenate. Representative salts include cobalt (II) 2-ethylhexanoate, cobalt oleate, and cobalt (II) neodecanoate. (The metal salt also can be an ionomer, in which case a polymeric counterion is employed.)

When used in forming a packaging article, the oxygen scavenging composition of the present invention can include only the above-described polymers and a transition metal catalyst. However, photoinitiators can be added to further facilitate and control the initiation of oxygen scavenging properties. Adding a photoinitiator or a blend of photoinitiators to the oxygen scavenging composition can be preferred, especially where antioxidants have been added to prevent premature oxidation of the composition during processing and storage.

Suitable photoinitiators are known to those skilled in the art. See, e.g., PCT publication WO 97/07161, WO 97/44364, WO 98/51758, and WO 98/51759 the teachings of which are incorporated herein by reference as if set forth in full. Specific examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis(dimethylamino)-benzophenone, acetophenone and its derivatives, such as, o-methoxy-acetophenone, 4'-methoxyacetophenone, valerophenone, hexanophenone, α-phenylbutyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetylphenanthrene, 10-thioxanthenone, 3-acetyl-phenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[a]anthracene-7,12-dione, 2,2-dimethoxy-2-phenylacetophenone, α,α-diethoxyacetophenone, α,α-dibutoxyacetophenone, 4-benzoyl-4'-methyl(diphenyl sulfide) and the like. Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl] propanone] also can be used. However, photoinitiators are preferred because they generally provide faster and more efficient initiation. When actinic radiation is used, photoinitiators also can provide initiation at longer wavelengths which are less costly to generate and present less harmful side effects than shorter wavelengths.

When a photoinitiator is present, it can enhance and/or facilitate the initiation of oxygen scavenging by the composition of the present invention upon exposure to radiation. The amount of photoinitiator can depend on the amount and type of cyclic unsaturation present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which underneath another layer is somewhat opaque to the radiation used, more initiator might be needed. However, the amount of photoinitiator used for most applications ranges from about 0.01 to about 10% (by wt.) of the total composition. Oxygen scavenging can be initiated by exposing an article containing the composition of the present invention to actinic or electron beam radiation, as described below.

One or more antioxidants can be incorporated into the scavenging composition of the present invention to retard degradation of the components during compounding and film formation. Although such additives prolong the induction period for oxygen scavenging activity to occur in the absence of irradiation, the layer or article (and any incorporated photoinitiator) can be exposed to radiation at the time oxygen scavenging properties are required. Suitable antioxidants include 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E (α-tocopherol), octadecyl 3,5,-di-tert-butyl-4-hydroxyhydrocinnamate, tetrakis[methylene(3,5-di-tert-butyl-4-hydroxyhydrocinnamate)]methane and the like.

When an antioxidant is included as part of the composition of the present invention, it preferably is present in an amount which prevents oxidation of the components of the oxygen scavenging composition as well as other materials present in a resultant blend during formation and processing; however, the amount preferably is less than that which interferes with the scavenging activity of the resultant layer, film, or article after initiation has occurred. The amount needed in a given composition can depend on the components present therein, the particular antioxidant used, the degree and amount of thermal processing used to form the shaped article, and the dosage and wavelength of radiation applied to initiate oxygen scavenging. Typically, such antioxidant(s) are used in an amount of from about 0.01 to about 1% (by wt.).

Other additives that also can be included in the oxygen scavenging composition of the present invention include, but are not necessarily limited to, fillers, pigments, dyestuffs, processing aids, plasticizers, antifog agents, antiblocking agents, and the like.

The amounts of the components used in the oxygen scavenging composition of the present invention can affect the use and effectiveness of this composition. Thus, the amounts of polymer, transition metal catalyst, and any photoinitiator, antioxidant, polymeric diluents, additives, etc., can vary depending on the desired article and its end use. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction period.

The composition of the present invention can provide oxygen scavenging properties at a desirable rate and capacity while having good processing and compatibility properties relative to compositions including conventional non-cyclic ethylenically unsaturated polymers. Thus, the present composition can be used to provide, by itself or as a blend with diluent film-forming polymers such as polyolefins and the like, a packaging material or film that can be manufactured and processed easily. Further, the subject oxygen scavenging composition will deplete the oxygen within a package cavity without substantially detracting from the color, taste, and/or odor of the product contained therein.

The amount of the polymeric scavenging component contained in the subject composition can range from about 1 to almost about 100%, preferably from about 5 to about 97.5%, more preferably from about 10 to 95%, even more preferably from about 15 to about 92.5%, still more preferably from about 20 to about 90%, (with all of the foregoing percentages being by weight) of the composition or layer made therefrom. Typically, the amount of transition metal catalyst can range from 0.001 to 1% (by wt.) of the scavenging composition, based on the metal content only (i.e., excluding ligands, counterions, etc.). Where one or more other scavenging compounds and/or diluent polymers are used as part of the composition, such other materials can make up as much as 99%, preferably up to about 75%, by weight of the scavenging composition. Any further additives employed normally do not make up more than 10%, preferably no more than about 5%, by weight of the scavenging composition.

As indicated above, the composition of the present invention can be used to produce a scavenging monolayer film, a scavenging layer of a multilayer film, or other articles for a variety of packaging applications. Single layer articles can be prepared readily by extrusion processing. Multilayer films typically are prepared using coextrusion, coating, lamination or extrusion/lamination as taught in, for example, U.S. Pat. Nos. 5,350,622 and 5,529,833, the teachings of which are incorporated herein by reference as if set forth in full. At least one of the additional layers of a multilayer article can include a material having a permeance to oxygen of no more than about $5.8 \times 10^{-8}$ $cm^3/m^2 \cdot s \cdot Pa$ (i.e., about 500 $cm^3/m^2 \cdot 24$ hours·atm) at about 25° C. Polymers which are commonly used in such oxygen barrier layers include poly (ethylene/vinyl alcohol), poly(vinyl alcohol), polyacrylonitrile, PVC, PVDC, PET, silica, and polyamides such as nylon 6, MXD6, nylon 66, as well as various amide copolymers. (Metal foil layers can also provide oxygen barrier properties.) Other additional layers can include one or more layers which are permeable to oxygen. In one preferred packaging construction, especially flexible packages for food, the layers can include (in order starting from the outside of the package to the innermost layer of the package) (a) an oxygen barrier layer, (b) a scavenging layer, i.e. one that includes the scavenging composition described supra, and optionally, (c) an oxygen permeable layer. Control of the oxygen barrier property of layer (a) provides a means to regulate the scavenging life of the package by limiting the rate of oxygen entry to the scavenging layer (b), thus limiting the rate of consumption of scavenging capacity. Control of the oxygen permeability of layer (c) provides a means to set an upper limit on the rate of oxygen scavenging for the overall structure independent of the composition of scavenging layer (b). This can serve the purpose of extending the handling lifetime of the film in the presence of air prior to sealing of the package. Furthermore, layer (c) can provide a barrier to migration of the individual components or byproducts of the scavenging layer into the package interior. The term "exposed to the interior" refers to a portion of a packaging article having the subject scavenging composition which is either directly exposed or indirectly exposed (via layers which are $O_2$ permeable) to the interior cavity having oxygen sensitive product. Even further, layer (c) also can improve the heat sealability, clarity, and/or resistance to blocking of the multilayer film. Further additional layers such as tie layers, easy open layers, and seal layers can also be used. Polymers typically used in such tie layers include, for example, anhydride functional polyolefins.

The method of the present invention includes exposing the above-described composition to a package cavity having an oxygen sensitive product therein. A preferred embodiment provides for including a photoinitiator as part of the subject composition and subjecting a film, layer, or article that includes such a composition to radiation so as to initiate oxygen scavenging at desired rates. The thermal radiation used in heating and processing polymers typically used in packaging films (e.g., 100–250° C.) advantageously does not trigger the oxygen scavenging reaction.

The initiating radiation preferably is actinic, e.g., UV or visible light having a wavelength of from about 200 to about 750 nm, preferably of from about 200 to 600 nm, and most preferably from about 200 to 400 nm. Such light can be delivered in a continuous or pulsed manner. The layer, film, etc., containing the oxygen scavenging composition preferably is exposed to such radiation until it receives at least about 1 J/g of radiation, more preferably until it receives a dose in the range of about 10 to about 2000 J/g. The radiation also can be electron-beam radiation at a dosage of at least about 2 kiloGray (kG), preferably from about 10 to about 100 kG. Other potential sources of radiation include ionizing radiation such as gamma, X-ray, and corona discharge. Duration of exposure depends on several factors including, but not limited to, the amount and type of photoinitiator present, thickness of the layers to be exposed, thickness and opacity of intervening layers, amount of any antioxidant present, and the wavelength and intensity of the radiation source.

When using oxygen scavenging layers or articles, irradiation can occur during or after the layer or article is prepared. If the resulting layer or article is to be used to package an oxygen sensitive product, exposure can be just prior to, during, or after packaging. For best uniformity of radiation, exposure preferably occurs at a processing stage where the layer or article is in the form of a flat sheet. For further information on initiation via irradiation, the reader is directed to PCT publications WO 98/05555 and WO 98/05703, as well as PCT 97/13598, 97/13370, 97/13369, the teachings of which are incorporated herein by reference.

Determining the oxygen scavenging rate and capacity of a given oxygen scavenging composition contemplated for a particular use can be beneficial. To determine the rate, the time elapsed before the scavenger depletes a certain amount of oxygen from a sealed container is measured. In some instances the rate can be determined adequately by placing a film containing the desired scavenging composition in an air-tight, sealed container of an oxygen containing atmosphere, e.g., air which typically contains 20.6% (by vol.) $O_2$. Over time, samples of the atmosphere inside the container are removed to determine the percentage of oxygen remaining. (Usually, the specific rates obtained vary under different temperature and atmospheric conditions. Atmospheres having lower initial oxygen content and/or maintained under low temperature conditions provide a more stringent test of the scavenging ability and rate of a composition. The rates which follow are at room temperature and one atmosphere of air, unless otherwise specified.) When an active oxygen barrier is needed, a useful scavenging rate can be as low as about 0.05 $cm^3$ oxygen per gram of the polymer in the scavenging composition per day in air at 25° C. and at 1 atm (101.3 kPa). However, in most instances, the present composition has a rate equal to or greater than about $5.8 \times 10^{-6}$ $cm^3/g \cdot s$ (0.5 $cm^3/g \cdot day$), even up to or greater than about $5.8 \times 10^{-5}$ $cm^3/g \cdot s$ (5 $cm^3/g \cdot day$). Further, films or layers including the subject composition are capable of a scavenging rate greater than about $1.2 \times 10^{-4}$ $cm^3/m^2 \cdot s$ (10 $cm^3/m^2 \cdot day$) and under some conditions, greater than about $2.9 \times 10^{-4}$ $cm^3/m^2 \cdot s$ (25 $cm^3/m^2 \cdot day$). (Generally, films or layers generally deemed suitable for use as an active oxygen barrier can have a scavenging rate as low as $1.2 \times 10^{-5}$ $cm^3/m^2 \cdot s$ (1 $cm^3/m^2 \cdot day$) when measured in air at 25° C. and 101 kPa (1 atm). Such rates make those layers suitable for scavenging oxygen from within a package, as well as suitable for active oxygen barrier applications.

When the method of the present invention is to be used in an active oxygen barrier application, the initiated oxygen scavenging activity, in combination with any oxygen barriers, preferably creates an overall oxygen permeance of less than about $1.1 \times 10^{-10}$ $cm^3/m^2 \cdot s \cdot Pa$ (1.0 $cm^3/m^2 \cdot day \cdot atm$) at 25° C. The oxygen scavenging capacity preferably is such that this value is not exceeded for at least two days.

Once scavenging has been initiated, the scavenging composition, layer, or article prepared therefrom preferably is able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using scavengers that include the composition of the present invention, the capacity can be as low as 1 $cm^3/g$, but can be 50 $cm^3/g$ or higher. When such scavengers are in a layer of a film, the layer preferably has an oxygen capacity of at least about 9.8 $cm^3/m^2$ per $\mu m$ thickness (250 $cm^3/m^2$ per mil), more preferably at least about 47 $cm^3/m^2$ per $\mu m$ thickness (1200 $cm^3/m^2$ per mil).

The composition of the present invention has been found to be capable of providing a film, layer or article which substantially retains its physical properties (e.g., tensile strength and modulus) even after substantial oxygen scavenging has occurred. In addition, the present composition does not provide significant amounts of byproducts and/or effluents, which can impart an undesired taste, color, and/or odor to the packaged product.

Objects and advantages of this invention are further illustrated by the following examples. The particular materials and amounts thereof, as well as other conditions and details, recited in these examples should not be used to unduly limit this invention.

EXAMPLE 1

Preferred embodiments of the present invention include polymers and oligomers which contain cyclohexene groups accessible to free oxygen molecules. These polymers or oligomers may be prepared from any of a number of methods though one preferred reaction comprises 1,2,3,6-tetrahydrophthalic anhydride. This anhydride is a low cost monomer derived from butadiene which makes it particularly attractive on a commercial scale. The anhydride may be used to make polyester resins such as by reaction with diols. It may also be reacted with hydroxy or polyhydroxy compounds to produce half esters suitable for subsequent use in plastic film and materials manufacture.

EXAMPLE 2

Non-aromatic alkenyl benzyl alcohols (e.g. tetrahydrobenzyl alcohols) may also be reacted with certain compounds to produce useful scavengers. For instance tetrahydrobenzyl alcohol may be reacted with compounds containing a carboxylic acid, acid halide, ester, anhydride, and/or isocyanate functionality. These compounds may be small molecules or oligomers or polymers. For example, tetrahydrobenzyl alcohol may be reacted with styrene, maleic anhydride copolymers or with polyfunctional isocyanates.

EXAMPLE 3

Cyclohexene dimethanol compounds may be used to prepare oxygen absorbing polyesters and polyurethanes.

EXAMPLE 4

As another example, tetrahydrobenzoic acid and tetrahydrobenzaldehyde may also be used to modify various hydroxyl functional materials.

EXAMPLE 5

Reactions such as the functionalization of polymers may be carried out by a reactive extrusion process. For instance this may be a transesterification process.

A reactive extrusion process may also be used to compatibilize the oxygen absorbing material with a commodity polymer such as polyethylene. Maleic anhydride grafted polymers are particularly suitable for this type of application. Other types of cyclic anhydride grafted substances are also useful.

EXAMPLE 6

Cyclohexene anhydrides may be used in the preparation of useful oxygen scavengers. These cyclohexene anhydrides may be prepared from a diene monomer such as butadiene with maleic anhydride. Of commercial attractiveness are their low cost and their ability to be converted into a number of useful intermediates. In addition, they may also be used to functionalize OH containing polymers. The half esters which form rapidly when a cyclic anhydride reacts with an OH group may be subsequently neutralized and the resultant materials dispersed in ionomers or ethylene acrylic acid copolymers (for instance).

For ease of use, small functionalized molecules such as the reaction product of four moles of tetrahydrophthalic anhydride with pentaerythritol may be prepared either by heating in a mutual solvent or by a reactive extrusion process. These may then be dispersed into a commodity polymer such as EVA.

The cyclohexene anhydride may also be converted into linear polyesters by reaction with ethylene glycol and the like.

EXAMPLE 7

Useful anhydrides are cyclic anhydrides and in particular the Diels Alder adducts of various alkenes. Typically this will comprise 1,3-butadiene (and substituted derivatives) with other compounds able to complete a Diels Alder type reaction. The resulting anhydrides may then be used in the manufacture of various oxygen scavengers, and polymers containing same.

EXAMPLE 8

Film structures, coatings, and moulded articles, as well as sachets and impregnated matrices, are envisaged incorporating oxygen scavengers as discussed previously. Also included are transition metal catalysts such as used in the prior art for catalyzing oxygen scavenging reactions. Optionally initiators or triggers for the reaction may also be included.

EXAMPLE 9

Preparation of a Low Molecular Weight Oxidisable Oil from 3-Cyclohexene-1-carbonyl chloride and triethylene glycol 3-Cyclohexene-1-carbonyl chloride was prepared as follows: 50 g of thionyl chloride was added to 27.6 g of 3-cyclohexene-1-carboxylic acid and the solution was stirred for two hours at 50° C. Excess thionyl chloride was removed under vacuum and the resulting yellow brown oil was purified by distillation under vacuum (bp 80–82° C. at 18–19 mm Hg).

The oil was then prepared in the following manner:

In a 250 ml flask fitted with a drying tube was placed 18.7 g of 3-cyclohexene-1-carbonyl chloride and 40 cc of methylene chloride. A solution of 9.6 g of triethylene glycol in 20 ml of methylene chloride was added and the reaction was stirred for 2 hours at room temperature, by which time the evolution of hydrochloric acid had ceased.

80 ml of 10% aqueous sodium bicarbonate was added to the reaction mixture and the mixture was vigorously stirred for 45 minutes. The organic layer was collected, washed with water and then dried with magnesium sulphate. The methylene chloride was removed under reduced pressure giving a colourless oil. The cyclohexene oil was compounded into a film with the following parts by weight:

| | |
|---|---|
| Oil | 12 |
| Silica | 5 |
| Benzophenone | 0.3 |
| Cobalt(111) acetylacetonate | 0.28 |
| Ethylene vinyl acetate copolymer (18% EVA) | 90 |

A similar film was prepared using sunflower seed oil in place of the cyclohexene based oil.

Both films were exposed to 4 minutes of UV light, then sealed in oxygen barrier bags and stored in the dark.

Both materials scavenged oxygen after photoexposure and the sunflower oil based material was a faster scavenger than the cyclohexene oil based material. However, gas chromatography of the headspace of the bags post oxidation revealed that there was a very large difference in the levels of volatile components. The cyclohexene based material produced less than 3% of the volatile components produced by the sunflower oil based material.

The cyclohexene based films were stable for more than 300 days if stored at room temperature in the absence of light (i.e. the oxygen concentration in a sealed package containing the film specimens was essentially unchanged after storage for this time period).

A similar cyclohexene based film was prepared, this time using 3,4-dimethyl-3-cyclohexene-1-carbonyl chloride as the starting material. This film was a much faster oxygen absorber than the film prepared from the unsubstituted product. The film from the substituted produced less than 10% of the total volatile components produced from an equivalent film made from sunflower oil.

The dimethyl cyclohexene based films were stable for at least two hundred days when stored at room temperature in the absence of light. The stability of similar vegetable oil based films was limited to around 50 days.

This series of experiments revealed the following:
1. Cyclohexene functionalised materials are effective oxygen absorbers.
2. The speed of reaction may be increased by substituting methyl groups adjacent to the double bond.
3. Cyclic alkene based materials produce much lower levels of volatile oxidation products than linear alkene based materials.
4. The storage stability of cyclohexene containing films is excellent.

EXAMPLE 10

Preparation of an Oxidisable Polyester Resin

In a three neck round bottom flask equipped with a Dean-Stark trap, reflux condenser and nitrogen inlet/exit were placed the following materials:
cis-1,2,3,6-Tetrahydrophthalic anhydride 35.54 g
1,4-Butanediol 20 g 75 ml of xylene was added, so that the trap was full of xylene and the mixture was brought to reflux. The reaction was refluxed for six and a half hours. 0.55 g of p-Toluenesulfonic acid monohydrate was added and reflux was continued for a further six and a half hours. 25 ml of xylene was removed from the trap and the mixture was refluxed for a further one hour. A very viscous pale coloured solution was obtained.

The solution was extracted with methanol to remove the acid catalyst, and was diluted with dichloromethane prior to use.

The polymer was obtained as a 38% w/w solids solution in toluene/dichloromethane. To 12.37 g of the polymer solution was taken 0.0213 g cobalt Ten-Cem® (OMG Inc.) in 5 mL of dichloromethane and 0.0069 g of Quantacure™ CPTX (1-chloro-4-propoxythioxanthone, Great Lakes Fine Chemicals) was added. The mixture was stirred for a few minutes and a film was cast onto the surface of another film at a wet thickness of about 1 mm. A second film was formulated as follows and cast as above: 12.64 g polymer solution, 0.0318 g cobalt Ten-Cem® and 0.0074 g 4,4'-dimethoxybenzophenone (DMOBP, Spectrum Quality Products Inc.).

The dried films were irradiated for 2.5 minutes with a combination of germicidal and backlight UV lamps. The approximate dose of UVC was 1350mJ/cm² and the approximate dose of UVA was 1950 mJ/cm². The irradiated films were sealed in a barrier pouch along with 120 cc of air. The oxygen content was monitored with time and the following results were obtained:

| Elapsed Time (days) | Percent Oxygen |
|---|---|
| Film #1, 4.7 g, 1020 ppm Cobalt and 1470 ppm CPTX | |
| 0 | 20.6 |
| 1 | 19.2 |
| 2 | 18.4 |
| 3 | 16.9 |
| Film #2, 4.8 g, 1500 ppm Cobalt and 1480 ppm DMOBP | |
| 0 | 20.6 |
| 1 | 19.3 |
| 2 | 18.6 |
| 3 | 17.0 |

This example illustrates that polyesters derived from tetrahydrophthalic anhydride are useful oxygen scavengers.

EXAMPLE 11

Preparation of an Oxidisable Polymer from 3-Cyclohexene-1-methanol and an Alternating Copolymer of Maleic Anhydride and Octadecene In a three neck round bottom flask equipped with condenser and nitrogen inlet was placed 20 g of poly(maleic anhydride-alt-1-octadecene). 80 cc of methylene chloride was added and the mixture was stirred to dissolve. After a clear solution had been obtained 3.2 g of 3-Cyclohexene-1-methanol was added, and washed into the flask with a further 10 cc of methylene chloride. The mixture was refluxed with stirring under nitrogen for two hours, then left overnight at room temperature. The solution was refluxed for a further three hours, and allowed to cool to room temperature.

The polymer was obtained as a 21.9 wt. % solution in dichloromethane. To 20.51 g of the polymer solution was added 0.0201 g of cobalt Ten-Cem® (OMG Inc., 22.5% Co by wt.) dissolved in 5 mL of toluene solution and 0.0038 g of Quantacure™ BMS (4-benzoyl-4'-methyl(diphenyl sulfide) available from Great Lakes Fine Chemicals Ltd.). The mixture was stirred for a few minutes and a film was cast using a draw down bar to a wet film thickness of about 1 mm.

A second film was formulated as follows: 20.10 g polymer solution, 0.0474 g cobalt Ten-Cem®, 0.0079 g 4,4'-dimethylbenzophenone (DMBP, from Lancaster Synthesis).

A third film was formulated as follows: 20.84 g polymer solution, 0.0398 g cobalt Ten-Cem®, 0.0085 g 2-isopropylthioxanthone (ITX, First Chemical Co.).

The dried films were irradiated for 2.5 minutes with a combination of germicidal and blacklight UV lamps. The approximate dose of UVC was 1350 mJ/cm² and the approximate dose of UVA was 1950 mJ/cm². The irradiated films were sealed in a barrier pouch along with about 120 cc of air. The oxygen content was monitored with time as described elsewhere. The following results were obtained:

| Elapsed Time (days) | Percent Oxygen |
|---|---|
| Film Sample #1, 1.34 g, with 1004 ppm cobalt and 844 ppm BMS | |
| 0 | 20.6 |
| 1 | 12.2 |
| 2 | 7.5 |
| 5 | 6.2 |
| Film Sample #2, 3.04 g, with 2420 ppm cobalt and 1795 ppm DMBP | |
| 0 | 20.6 |
| 1 | 11.8 |
| 2 | 10.0 |
| 5 | 9.7 |
| Film Sample #3, 2.09 g, with 1960 ppm cobalt and 1860 ppm ITX | |
| 0 | 20.6 |
| 1 | 13.8 |
| 2 | 10.5 |
| 5 | 10.0 |

The results suggest that the reaction of a polymeric anhydride and tetrahydrobenzyl alcohol is a useful route to oxygen scavenging plastics.

EXAMPLE 12

Preparation of a Cyclohexene Containing Polymer by Transesterification

To a 2 L resin kettle was taken 180 g of polyethylene-co-methyl acrylate (EMAC® SP2260, Chevron, 24 wt. % methyl acrylate) and 1 L of toluene. The kettle was equipped with a mechanical overhead stirrer, Dean-Stark trap and a condenser. The kettle was heated to melt the polymer. To the stirred solution was added 28.12 g of 3-cyclohexene-1-methanol, followed by the addition of 2.145 g of 4-(2-hydroxyethoxy)benzophenone. (Note: this benzophenone derivative was prepared by the method of Yoshino et al., Bull. Chem. Soc. Japan, 1973, 46, 553-6 using 4-hydroxybenzophenone, ethylene carbonate and tetraethylammonium iodide.) The catalyst, titanium(IV) isopropoxide (1.05 g) was added. The mixture turned yellow and the reflux rate increased. Heat was maintained for 4 hours and about 75 mL of condensate was removed in four fractions. An additional 0.5 g of titanium isopropoxide was added and heat was maintained for and additional 8 hours. Additional toluene was added as needed to maintain the reaction volume. Again an additional 0.5 g of catalyst was added and heat maintained for another 8 hours. Analysis of the condensate showed no more production of methanol. The reaction mixture was cooled to a gel and precipitated into methanol. The polymer was washed with methanol until nothing was extracted into the methanol fractions.

The above resin containing cyclohexene pendant groups and a covalently bound benzophenone derivative was melt compounded with 500 ppm vitamin E as the antioxidant and 10% of an EVA based cobalt(II) oleate (Shepherd Chemicals) masterbatch. The masterbatch contained 1.0% cobalt metal by weight. Samples were compression molded and cut to 197.56 cm². A sample was given a dose of 800 mJ/cm² of UVC light (254 nm) and was sealed in an oxygen barrier pouch (Cryovac P640B) with 300 cc of air and was stored in the dark at room temperature. Headspace oxygen levels were monitored periodically by withdrawing a 4 cc sample and analyzing using a Mocon model LC 700F oxygen analyzer. The following results were obtained for the 1.9 g (7.8 mil thick) sample.

| Elapsed Time (days) | Percent Oxygen |
|---|---|
| 0 | 20.6 |
| 1 | 15.6 |
| 5 | 5.0 |
| 14 | 2.1 |
| 21 | 1.2 |

This example illustrates excellent oxygen scavenging ability from this type of polymer and the usefulness of a covalently bound photoinitiator.

EXAMPLE 13

Preparation of Oxidisable Polyurethanes

In a two necked 250 ml flask equipped with reflux condenser and nitrogen inlet/exit were placed the following materials:

| | |
|---|---|
| 1,6-Diisocyanatohexane | 6.5 g |
| 3-Cyclohexene-1,1dimethanol | 5.23 g |
| 2-Butanone | 70 ml |

One drop of dibutyltin dilaurate was added and the mixture was stirred under nitrogen for thirty minutes at room temperature. The mixture was then brought to reflux for a further four hours and one drop of water in 10 ml of MEK was added. The mixture was refluxed for a further hour and then allowed to cool to room temperature. The polymer solution was precipitated into methanol and was air dried.

The polymer (3.912 g) was taken into 10 mL dichloromethane and a solution of 0.0243 g of cobalt Ten-Cem® (OMG Inc.) in 5 mL of dichloromethane was added. To the stirred mixture was added 0.0084 g of 4,4'-dimethylbenzophenone (DMBP, Lancaster Synthesis). The mixture was stirred for about 15 minutes. A film was cast from the solution on the surface of another film at a wet thickness of about 1 mm. The dried film was triggered and tested as described in example 3 above.

| 3.9 g, with 1400 ppm Cobalt and 2150 ppm DMBP | |
|---|---|
| Elapsed Time (days) | Percent Oxygen |
| 0 | 20.6 |
| 1 | 18.3 |
| 4 | 13.1 |
| 5 | 9.5 |

These results suggest that polyurethanes derived from 3-Cyclohexene-1,1-dimethanol are useful oxygen absorbers. These materials and alternative formulations may be useful in formulating oxygen scavenging adhesive resins for use in flexible packaging i.e., for use in lamination.

EXAMPLE 14

Preparation of a Poly (Vinyl Acetal) from Poly (Vinyl Alcohol) and 3-Cyclohexene-1-carboxaldehyde In a 500 ml flask equipped with nitrogen inlet/exit and mechanical stirrer was placed 150 ml of a 70/30 mix of dioxane/ethanol and 10 g of poly(vinyl alcohol). The mixture was stirred and 15.7 g of 3-Cyclohexene-1-carboxaldehyde was added, followed by 0.25 ml conc.HCl and 5 mg of hydroquinone. The mixture was refluxed for four hours, during which time the poly(vinyl alcohol) dissolved and turned a pale yellow colour. 0.5 g of sodium acetate was added followed by 2.5 g of urea, both in aqueous solution,. The polymer precipitated and was purified by addition of further dioxane then precipitation into water. The dried polymer was found to contain approximately 63 mole % of acetal groups.

A similar polymer was prepared from 3,4-dimethyl-3-cyclohexene-1-carboxaldehyde and poly(vinyl alcohol) which contained approximately 65 mole % of acetal groups.

A solution of cobalt (III) acetylacetonate (20 mg) and benzophenone (20 mg) in methylene chloride was added with stirring to a solution (1 g) of each acetal resin dissolved in 15 ml of warm dioxane. The solution was poured into a 150 mm diameter flat bottom petri dish and the solvent was allowed to evaporate. The resultant film was held under high vacuum for 2–3 hours to remove any residual solvent. A further sample containing 30% of a dibutyl phthalate plasticiser was also prepared using the dimethyl substituted acetal resin described above.

The film samples were exposed to 4 minutes of UVA radiation and then vacuum packed in a barrier bag. 200 ml of air was injected into the bag and the puncture point was isolated by heat sealing. The pouch was stored in the absence of light.

The following results were obtained for the unsubstituted resin:

| Elapsed Time (days) | Percent Oxygen |
|---|---|
| 0 | 20.6 |
| 1 | no reading |
| 3 | 9.9 |
| 6 | 7.2 |
| 12 | 1.2 |

The following results were obtained for the disubstituted resin:

| Elapsed Time (days) | Percent Oxygen |
|---|---|
| 0 | 20.6 |
| 1 | 10.2 |
| 3 | 4.3 |
| 6 | 1.4 |
| 21 | 0 |

The following results were obtained from the plasticised resin:

| Elapsed Time (days) | Percent Oxygen |
|---|---|
| 0 | 20.6 |
| 3 | 3.7 |
| 4 | 1.8 |
| 7 | 0.2 |
| 12 | 0 |

These results demonstrate the following principles:
1. Cyclohexene based acetal resins are effective oxygen scavengers.

2. The substituted cyclohexene rings provide faster oxygen scavengers than the unsubstituted resins.
3. A plasticiser tends to increase the rate of oxygen scavenging.

Also included within this example and the scope of the invention are compositions comprising various combinations of these substances and materials.

Aspects of the present invention have been described by way of example only and it should be appreciated that modifications and additions may be made thereto without departing from the scope thereof.

What is claimed is:

1. An oxygen scavenger composition comprising a polymer or oligomer having at least one cyclohexene group, and a transition metal salt, compound, or complex,
wherein the polymer or oligomer is prepared from the reaction of a tetrahydrophthalic anhydride with at least one of:
   i) a diol;
   ii) a hydroxy compound; or
   iii) a polyhydroxy compound.

2. The composition of claim 1 wherein the polymer or oligomer is prepared by heating tetrahydrophthalic anhydride with at one of:
   i) a diol;
   ii) a hydroxy compound; or
   iii) a polyhydroxy compound,
in a solvent.

3. The oxygen scavenger composition of claim 1 wherein the anhydride comprises 1,2,3,6-tetrahydrophthalic anhydride, or tetrahyrophthalic anhydride monomer derivable from butadiene.

4. The composition of claim 1 wherein the polymer or oligomer is prepared by a reactive extrusion process.

5. An oxygen scavenger composition comprising a polymer or oligomer having at least one cyclohexene group, and a transition metal salt, compound, or complex, wherein the polymer or oligomer is prepared from the reaction of a tetrahydrobenzyl alcohol with one or more compounds having one or more of the following functionalities:
   i) carboxylic acid;
   ii) acid halide;
   iii) anhydride; and
   iv) isocyanate.

6. The oxygen scavenger composition of claim 5 wherein the polymer or oligomer is prepared by a reactive extrusion process.

7. The oxygen scavenger composition of claim 5 wherein the compound with the anhydride functionality comprises styrene maleic anhydride copolymer.

8. The oxygen scavenger composition of claim 5 wherein the compound with the isocyanate functionality comprises polyfunctional isocyanate.

9. An oxygen scavenger composition comprising a polymer or oligomer having at least one cyclohexene group, and a transition metal salt, compound, or complex, wherein the polymer or oligomer comprises a polyester, wherein the composition is prepared from cyclohexene dimethanol.

10. An oxygen scavenger composition comprising a polymer or oligomer having at least one cyclohexene group, and a transition metal salt, compound, or complex, wherein the polymer or oligomer comprises a polyurethane, wherein the composition is prepared from cyclohexene dimethanol.

11. An oxygen scavenger composition comprising a polymer or oligomer having at least one cyclohexene group, and a transition metal salt, compound, or complex, wherein the polymer or oligomer is prepared from tetrahydrobenzoic acid and a hydroxyl functional material.

12. An oxygen scavenger composition comprising a polymer or oligomer having at least one cyclohexene group, and a transition metal salt, compound, or complex, wherein the polymer or oligomer is prepared from tetrahydrobenzoic acid and poly(vinyl acetate) or poly(ethylene vinyl acetate).

13. An oxygen scavenger composition comprising a polymer or oligomer having at least one cyclohexene group, and a transition metal salt, compound, or complex, wherein the polymer or oligomer is prepared from tetrahydrobenzaldehyde and a hydroxyl functional material.

14. An oxygen scavenger composition comprising a polymer or oligomer having at least one cyclohexene group, and a transition metal salt, compound, or complex, wherein some carbons of the cyclohexene group form part of other ring structures within the polymer or oligomer.

15. An oxygen scavenger composition comprising a polymer or oligomer having at least one cyclohexene group, and a transition metal salt, compound, or complex, wherein the polymer or oligomer comprises a pendant cyclic alkene group, the composition prepared by a method wherein some carbons of the cyclohexene group form part of the skeleton of the polymer or oligomer.

16. An oxygen scavenger composition comprising a polymer or oligomer having at one cyclohexene group, and a transition metal salt, compound, or complex, wherein the polymer or oligomer comprises:
   a polymeric or oligomeric material containing a substituted cyclohexene functionality according to the following diagram;

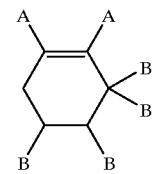

wherein:
   A is hydrogen or methyl;
   two of the B groups is a heteroatom containing linkage which attaches the cyclohexene ring to the said material; and
   the remaining B groups are hydrogen or methyl.

17. The composition of claim 16 wherein the heteroatom containing linkage comprises a material selected from the group consisting of ester, ether, amide, imide, urethane, or acetal group.

* * * * *